April 1, 1958 G. ELLIOTT 2,829,205

DUPLEX SIGNALING CIRCUIT

Filed Oct. 28, 1955

INVENTOR.
GEORGE ELLIOTT
BY F. H. Henson
AGENT

United States Patent Office 2,829,205

Patented Apr. 1, 1958

2,829,205

DUPLEX SIGNALING CIRCUIT

George Elliott, Rochester, N. Y., assignor to General Dynamics Corporation, a corporation of Delaware Application October 28, 1955, Serial No. 543,297

19 Claims. (Cl. 179—43)

Figure 1:
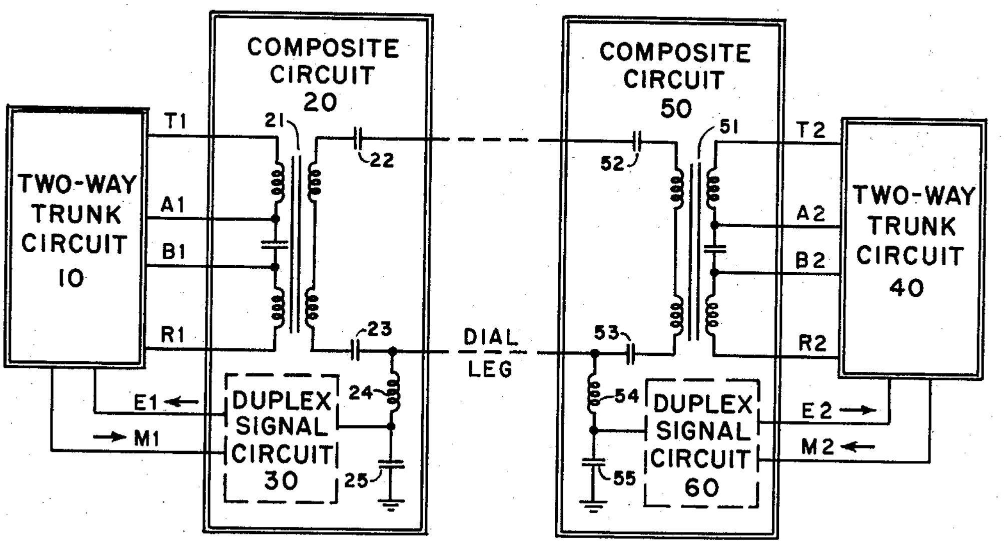

This invention relates in general to communication systems and more particularly to duplex signaling circuits for use in communication systems.

Although the present invention has general application in systems requiring two-way signaling, it is particularly adapted for interoffice signaling in telephone and telegraph systems. As is well known in the telephone art, two two-wire trunk lines are often used to carry three communication channels between offices. The first and second communication channels are carried on the physical trunk lines while the third communication channel is carried on a phantom connection to the trunk lines. A single trunk line conductor is utilized as a dial leg to transmit supervisory signals such as dial impulses, answer supervisory signals, etc., for each communication path. The fourth or spare dial leg may be used to transmit two-way telegraph signals or any other type of two-way signals. Each dial leg terminates in a duplex signaling circuit in each office. Prior to this invention, it has been conventional to provide a polar duplex or differential duplex relay in each signaling circuit. These relays have the inherent limitations of slowness, physical size, and maintenance problems associated with all electromechanical devices.

Accordingly, it is the general object of this invention to provide a new and improved duplex signaling circuit.

It is a more particular object of this invention to provide a new and improved duplex signaling circuit which utilizes transistors rather than the conventional relays to repeat supervisory signals received over a signal path from a distant office.

According to the present invention, a signaling circuit comprising a transistor terminates the signal path or dial leg in each office. In the illustrated embodiment of the invention, the input conductor to the signaling circuit is connected to the emitter electrode and through an impedance element to the base electrode of the transistor included in the signaling circuit. The signal path or dial leg is connected to the base electrode of the transistor and the output conductor from the signaling circuit is connected to the collector electrode of the transistor. When the trunk is idle, a first or ground potential is applied to the input conductor associated with each signaling circuit. Under these conditions, both transistors are biased for non-conduction.

When a second or battery potential is substituted for the first potential applied to the input conductor of a first one of the signaling circuits while the first potential is applied to the input conductor of the second signaling circuit, the potential of both the emitter and base electrodes of the transistor in the first signaling circuit is altered while the potential of only the base electrode of the transistor in the second signaling circuit is altered. Under these conditions, the transistor in the second signaling circuit is rendered conductive while the transistor in the first signaling circuit remains relatively non-conductive. Also the second potential can be applied to the input conductor of the second signaling circuit while the second potential is applied to the input conductor of the first signaling circuit. Under these conditions, the transistor in the second signaling circuit remains substantially conductive and the transistor in the first signaling circuit is rendered conductive.

Thus it can be seen tht the conductivity of the transistor in either signaling circuit is controlled solely by signals received over the dial leg from the distant office and that signals may be transmitted in either direction over the dial leg either simultaneously or at different times.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which comprises two figures on a single sheet.

Figure 2:
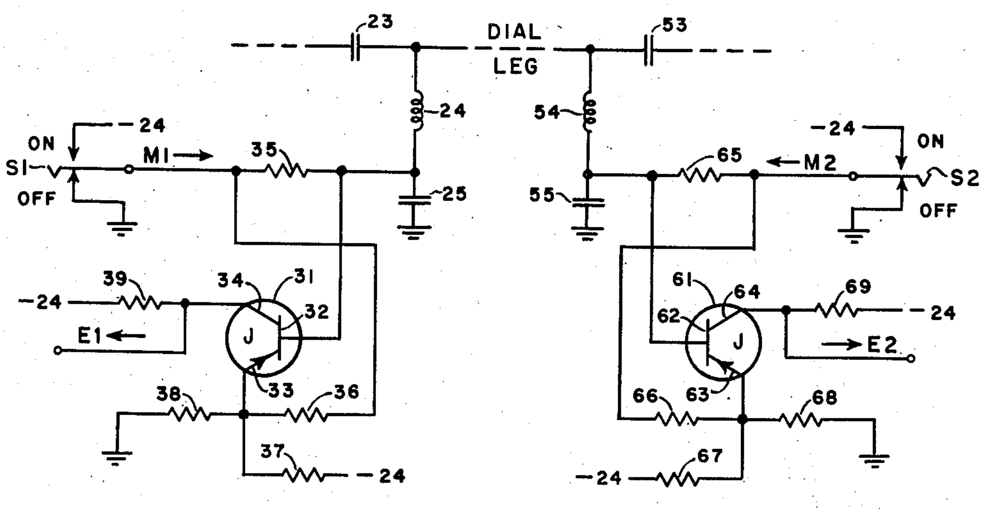

Fig. 1 shows a trunking diagram illustrating one application of a duplex signaling circuit; and Fig. 2 shows the circuit details of a duplex signaling circuit.

It is believed that a better understanding of the background and setting of the invention may be had by referring to the trunking diagram of Fig. 1. This trunking diagram is conventional for polar duplex signaling between electromechanical offices. Details of trunk circuits suitable for use in a system of this type are shown and described in the copending application of William W. Pharis, Serial No. 397,951, filed December 14, 1953, and assigned to the same assignee as the present invention. Although it is contemplated that the duplex signaling circuit, which forms the subject matter of this invention, will find its greatest use in signaling between electronic switching offices, it may also be used in a system of the type which utilizes trunk circuits and equipment of the type disclosed in the above-identified copending application.

As shown in Fig. 1, two-way trunk circuits 10 and 40, which are located in first and second offices, respectively, are interconnected by composite circuits 20 and 50 and a trunk line. Each composite circuit has been shown as including a duplex signal circuit such as signal circuits 30 and 60. Trunk circuit 10 is shown as connected to the windings of repeat coil 21 of composite circuit 20 by conductors T1, A1, B1, and R1 and also connected to the duplex signal circuit 30 by conductors M1 and E1. Trunk circuit 40 is shown as connected to the windings of repeat coil 51 in composite circuit 50 by conductors T2, A2, B2, and R2 and also connected to duplex signal circuit 60 by conductors M2 and E2. The duplex signal circuits 30 and 60 are connected to the dial leg of the trunk line through retard coils 24 and 54, respectively.

On an outgoing call from trunk circuit 10, an off-hook signal is connected to conductor M1 when trunk circuit 10 is seized from selector banks or by any other suitable means, and results in operating the duplex signal equipment in circuit 60 in such manner that the off-hook signal is repeated to conductor E2. The signal applied to output conductor E2 results in seizing trunk circuit 40 and its associated switching equipment. The off-hook signal applied to conductor M1 is then interrupted in accordance with dial impulses received from the calling line and the duplex signaling equipment in circuit 60 repeats the impulses over conductor E2 to trunk circuit 40. When the call is answered in the distant office, trunk circuit 40 applies an off-hook signal to conductor M2. This signal is repeated by the duplex signal equipment is circuit 30 to conductor E1. Retard coils 24 and 54 present a low impedance to the low frequency supervisory signals while capacitors 23 and 53 effectively block the signals from the repeat coils 21 and 51, respectively.

Speech current is transmitted between the trunk circuits by way of repeat coils 21 and 51 and capacitors 22, 23, 52, and 53. The capacitors present a low impedance to the relatively high frequency speech currents while retard coils 24 and 54 effectively block speech signals from the duplex signaling circuits 30 and 60, respectively. Capacitors 25 and 55 are provided to further decouple any speech signals from the signaling equipment.

On an outgoing call from trunk circuit 40, trunk circuit 40, of course, transmits the seizure signal and dial impulses over conductor M2 and the duplex signal equipment in circuit 30 repeats the signal and impulses over the output conductor E1 to trunk circuit 10.

Referring to Fig. 2, it can be seen that corresponding elements in Figs. 1 and 2 have been given the same designation. Also it is to be noted that the duplex signal circuits have been illustrated as comprising PNP junction transistors 31 and 61. It is to be understood that NPN junction transistors could be used with a reversal of polarity of the potentials shown. Simple mechanical switches S1 and S2 have been shown for the purpose of altering the potential applied to input conductors M1 and M2, respectively. It is to be understood that any well known means can be used to perform this function. For example, the potential could be altered by contacts on a pulsing relay in an electromechanical system, or could be altered by the state of conduction of a transistor or other means in an electronic switching system.

With switches S1 and S2 operated to the "off" position, a first or ground potential is applied to input conductors M1 and M2, respectively, and transistors 31 and 61 are biased for non-conduction since PNP transistors are non-conductive whenever their base electrode is positive with respect to their emitter electrodes. Ground potential applied to conductors M1 and M2 is applied to base electrodes 32 and 62 of transistors 31 and 61, respectively, through resistors 35 and 65, rspectively. Emitter electrode 33 of transistor 31 is biased at a slightly negative potential with respect to base electrode 32 by virtue of the voltage division across resistors 36, 37, and 38 which are connected to ground, —24 volts, and ground, respectively. Likewise, emitter electrode 63 of transistor 61 is biased at a slightly negative potential with respect to base electrode 62 by virtue of the voltage division across resistors 66, 67, and 68. With transistors 31 and 61 non-conductive, —24 volts potential is applied to the output conductors E1 and E2 through resistors 39 and 69, repectively.

Assume that switch S1 is operated to its "on" position while switch S2 is operated to its "off" position. When switch S1 is operated to its "on" position, a second potential of —24 volts is substituted for the ground potential applied to conductor M1. Current now flows over the dial leg from ground on conductor M2, through resistor 65, retard coil 54, over the dial leg, through retard coil 24, and through resistor 35 to —24 volts on conductor M1. The voltage drop across resistor 65 is, of course, applied to base electrode 62 of transistor 61 while the voltage drop across resistor 35 is applied to the base electrode 32 of transistor 31. Since the emitter electrode 63 of transistor 61 remains at the potential of the voltage division across bias resistors 66, 67, and 68, and since the resistance of resistor 67 is much greater than the resistance of resistor 68, transistor 61 is rendered conductive. When transistor 61 becomes conductive, the potential of base 62 and collector 64 follow the potential of emitter 63 which is slightly negative with respect to ground. Transistor 31 remains non-conductive or substantially non-conductive, as determined by the values of resistors 36 and 38 as will be discussed more fully hereinafter, since the potential applied to both its base and emitter electrodes is altered. The potential applied to the emitter electrode 33 is altered since resistor 36 is now returned to —24 volts instead of ground potential. The potential of base electrode 32 is altered due to the voltage drop across resistor 35 as determined by current flow over the dial leg from ground on conductor M2 and from the potential of base electrode 62 of conducting transistor 61 to —24 volts on conductor M1.

When transistor 61 becomes conductive, current flows from ground through resistors 68 and 66 in parallel, through the emitter, base, and collector of transistor 61, and through resistor 69 to —24 volts. The voltage drop across resistor 69 is thus applied to the output conductor E2.

If the potential of input conductor M1 is alternated between —24 volts and ground, as, for example, by dial impulses, transistor 61 is alternately rendered conductive and non-conductive, respectively, to repeat the impulses to output conductor E2. It will be obvious that when switch S2 is operated to its "on" position while switch S1 is operated to its "off" position, transistor 31 will be rendered conductive and transistor 61 will remain non-conductive in the same manner as just described for operation in the reverse direction.

Next assume that switch S1 has been operated to its "on" position and transistor 61 is thus conductive and that switch S2 is then operated to its "on" position. Under these conditions, transistor 61 remains conductive or substantially conductive while transistor 31 is rendered conductive. The potential of the base electrode 32 of transistor 31 is altered in a negative direction while the potential of emitter electrode 33 of transistor 31 remains constant. Thus the base electrodes of both transistors 31 and 61 are biased negative with respect to their emitter electrodes and both transistors conduct. The voltage drop across resistor R39 is applied to output conductor E1 when transistor 31 is rendered conductive.

From the above it can be seen that transistor 61 is rendered conductive whenever switch S1 is operated to its "on" position regardless of whether switch S2 is operated to its "on" position or to its "off" position, and that transistor 31 is rendered conductive whenever switch S2 is operated to its "on" position regardless of whether switch S1 is operated to its "on" position or to its "off" position.

In one tested embodiment of the invention in which transistors 31 and 61 were type 2N44, resistors 35, 39, 65, and 69 were 10,000 ohms, resistors 38 and 68 were 1,000 ohms, resistors 36 and 66 were 6,000 ohms, resistors 37 and 67 were 100,000 ohms, and the resistance of the dial leg was 150 ohms, the following measured values of the voltages applied to the output conductors E1 and E2 were obtained.

S1 off, S2 off—E1 at —24 volts, E2 at —24 volts
S1 on, S2 off—E1 at —23 volts, E2 at —6 volts
S1 off, S2 on—E1 at —6 volts, E2 at —23 volts
S1 on, S2 on—E1 at —6.5 volts, E2 at —6.5 volts It is to be noted that for these circuit values the operation of switch S1 produces a slight current flow in transistor 31 and the operation of switch S2 produces a slight current flow in transistor 61. For all practical purposes, however, the transistor remains in a non-conductive state since the output voltage fluctuates by just one volt. The current flow can be further reduced by increasing the resistance ratio of resistor 36 to resistor 38 and resistor 66 to resistor 68 and by using a higher gain transistor at each end of the dial leg.

While there has been shown and described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a signal path, first and second transistors, means for connecting said first transistor to a first end of said signal path, means for connecting said second transistor to the second end of said signal path, first and second output conductors, means for applying an output signal to said first output conductor when said first transistor is in a conducting state, means for applying an output signal to said second output conductor when said second transistor is in a conducting state, means at the second end of said signal path for controlling the state of conduction of said first transistor, and means at the first end of said signal path for controlling the state of conduction of said second transistor.

2. In combination, a signal path, first and second transistors, means for connecting said first transistor to a first end of said signal path, means for connecting said second transistor to the second end of said signal path, means for applying a first potential to both the first and second ends of said signal path, means for substituting a second potential for the first potential applied to the first end of said signal path while said first potential is applied to the second end of said signal path, means for biasing both said first and second transistors for non-conduction when said first potential is applied to both the first and second ends of said signal path, and for biasing said first transistor for non-conduction and said second transistor for conduction when said second potential is applied to the first end of said signal path while said first potential is applied to the second end of said signal path.

3. In combination, a signal path, first and second transistors, means for connecting said first transistor to a first end of said signal path, means for connecting said second transistor to the second end of said signal path, means for applying a first potential to both the first and second ends of said signal path, means for substituting a second potential for the first potential applied to the first end of said signal path while said first potential is applied to the second end of said signal path, means for substituting said second potential for the first potential applied to the second end of said signal path while said second potential is applied to the first end of said signal path, means for biasing both said first and second transistors for non-conduction when said first potential is applied to both the first and second ends of said signal path, for biasing said first transistor for non-conduction and said second transistor for conduction when said second potential is applied to the first end of said signal path while said first potential is applied to the second end of said signal path, and for biasing both said first and said second transistor for conduction when said second potential is applied to the second end of said signal path while said second potential is applied to the first end of said signal path.

4. In a communication system, a first office and a second office, a signal path interconnecting said offices, first and second transistors, means for connecting said first transistor to said signal path in said first office, means for connecting said second transistor to said signal path in said second office, first and second output conductors, means for applying an output signal to said first output conductor when said first transistor is in a conducting state, means for applying an output signal to said second output conductor when said second transistor is in a conducting state, means in said first office for controlling the state of conduction of said second transistor over said signal path, and means in said second office for controlling the state of conduction of said first transistor over said signal path.

5. In a communication system, a first office and a second office, a signal path interconnecting said offices, first and second transistors, means for connecting said first transistor to said signal path in said first office, means for connecting said second transistor to said signal path in said second office, means for applying a first potential to said signal path in both said first and second offices, means for substituting a second potential for the first potential applied to said signal path in said first office while said first potential is applied to said signal path in said second office, means for biasing both said first and second transistors for non-conduction when said first potential is applied to the signal path in both said first and second offices, and for biasing said first transistor for non-conduction and said second transistor for conduction when said second potential is applied to said signal path in said first office while said first potential is applied to the signal path in said second office.

6. In a communication system, a first office and a second office, a signal path interconnecting said offices, first and second transistors, means for connecting said first transistor to said signal path in said first office, means for connecting said second transistor to said signal path in said second office, means for applying a first potential to said signal path in both said first and second offices, means for substituting a second potential for the first potential applied to said signal path in said first office while said first potential is applied to said signal path in said second office, means for substituting said second potential for the first potential applied to said signal path in said second office while said second potential is applied to said signal path in said first office, means for biasing both said first and second transistors for non-conduction when said first potential is applied to the signal path in both said first and second offices, for biasing said first transistor for non-conduction and said second transistor for conduction when said second potential is applied to said signal path in said first office while said first potential is applied to the signal path in said second office, and for biasing both said first and said second transistors for conduction when said second potential is applied to said signal path in said second office while said second potential is applied to said signal path in said first office.

7. In combination, first and second control means, each of said control means having first and second operated conditions, a signal path interconnecting said first and second control means, first and second transistors, means for connecting each of said transistors to said signal path, first and second output conductors, means for applying an output signal to said first conductor when said first transistor is conductive, means for applying an output signal to said second conductor when said second transistor is conductive, circuit means for controlling said first transistor to be non-conductive as long as said second control means is operated to its first operated condition and to be conductive as long as said second control means is operated to its second operated condition, and for controlling said second transistor to be non-conductive as long as said first control means is operated to its first operated condition and to be conductive as long as said first control means is operated to its second operated condition.

8. In a communication system, a first office and a second office, a signal path interconnecting said offices, a first signaling circuit terminating said signal path in said first office, a second signaling circuit terminating said signal path in said second office, a first transistor in said first circuit, a second transistor in said second circuit, means for connecting a first input conductor to said first circuit, means for connecting a first output conductor to said first circuit, means for connecting a second input conductor to said second circuit, means for connecting a second output conductor to said second circuit, means in said first office for applying a signal to said first input conductor, means in said circuits for causing said second transistor to become conductive in response to the signal applied to said first input conductor, means responsive to the conduction of said second transistor for applying a signal to said second output conductor, means in said second office for applying a signal to said second input conductor, means in said circuits for causing said first transistor to become conductive in response to the signal applied to said second input conductor, and means responsive to the conduction of said first transistor for applying a signal to said first output conductor.

9. In a communication system, a first office and a second office, a signal path interconnecting said offices, a first signaling circuit terminating said signal path in said first office, a second signaling circuit terminating said signal path in said second office, a first transistor in said first circuit, a second transistor in said second circuit, means for connecting a first input conductor to said first circuit, means for connecting a first output conductor to said first circuit, means for connecting a second input conductor to said second circuit, means for connecting a second output conductor to said second circuit, means for applying a first potential to both said first and said second input conductors, means in said circuits for causing both said first and said second transistors to be non-conductive when said first potential is applied to both said first and second input conductors, means for substituting a second potential for the first potential applied to said first input conductor while said first potential is applied to said second input conductor, means in said circuits for causing said first transistor to remain substantially non-conductive and said second transistor to become conductive when said second potential is applied to said first input conductor while said first potential is applied to said second input conductor, and means responsive to the conduction of said second transistor for applying a signal to said second output conductor.

10. In a communication system, a first office and a second office, a signal path interconnecting said offices, a first signaling circuit terminating said signal path in said first office, a second signaling circuit terminating said signal path in said second office, a first transistor in said first circuit, a second transistor in said second circuit, means for connecting a first input conductor to said first circuit, means for connecting a first output conductor to said first circuit, means for connecting a second input conductor to said second circuit, means for connecting a second output conductor to said second circuit, means for applying a first potential to both said first and said second input conductors, means in said circuits for causing both said first and said second transistors to be non-conductive when said first potential is applied to both said first and second input conductors, means for substituting a second potential for the first potential applied to said first input conductor while said first potential is applied to said second input conductor, means in said circuits for causing said first transistor to remain substantially non-conductive and said second transistor to become conductive when said second potential is applied to said first input conductor while said first potential is applied to said second input conductor, means responsive to the conduction of said second transistor for applying a signal to said second output conductor, means for substituting said second potential for the first potential applied to said second input conductor while said second potential is applied to said first input conductor, means in said circuits for causing said second transistor to remain substantially conductive and said first transistor to become substantially conductive when said second potential is applied to said second input conductor while said second potential is applied to said first input conductor, and means responsive to the conduction of said first transistor for applying a signal to said first output conductor.

11. In a communication system, a first office and a second office, a signal path interconnecting said offices, a first signaling circuit terminating said signal path in said first office, a second signaling circuit terminating said signal path in said second office, each of said circuits comprising a transistor, an input conductor and an output conductor associated with each of said circuits, means in each circuit or applying a first signal to its associated output conductor when its associated transistor is in a state of conduction and for applying a second signal to its associated output conductor when its associated transistor is in a state of non-conduction, means in said first office for applying control signals to the input conductor of said first circuit, means in said second office for applying control signals to the input conductor of said second circuit, and circuit means whereby the state of conductivity of the transistor in said first circuit is controlled only by control signals applied to the input conductor associated with said second circuit and the state of conductivity of the transistor in said second circuit is controlled only by control signals applied to the input conductor associated with said second circuit.

12. In a communication system, a first office and a second office, a signal path interconnecting said offices, a first signaling circuit terminating said signal path in said first office, a second signaling circuit terminating said signal path in said second office, each of said circuits comprising a transistor, an input conductor associated with each of said circuits, means for applying a first potential to the input conductor associated with each of said circuits, circuit means whereby both said first and second transistors are controlled to be in a state of non-conduction when said first potential is applied to both input conductors, means for substituting a second potential for the first potential applied to the input conductor associated with said first circuit while said first potential is applied to the input conductor associated with said second circuit, and circuit means whereby said first transistor is controlled to remain in a state of non-conduction and said second transistor is controlled to be in a state of conduction when said second potential is applied to the input conductor associated with said first circuit while said first potential is applied to the input conductor associated with said second circuit.

13. In a communication system, a first office and a second office, a signal path interconnecting said offices, a first signaling circuit terminating said signal path in said first office, a second signaling circuit terminating said signal path in said second office, each of said circuits comprising a transistor, an input conductor associated with each of said circuits, means for applying a first potential to the input conductor associated with each of said circuits, circuit means whereby both said first and second transistors are controlled to be in a state of non-conduction when said first potential is applied to both input conductors, means for substituting a second potential for the first potential applied to the input conductor associated with said first circuit while said first potential is applied to the input conductor associated with said second circuit, circuit means whereby said first transistor is controlled to remain in a state of non-conduction and said second transistor is controlled to be in a state of conduction when said second potential is applied to the input conductor associated with said first circuit while said first potential is applied to the input conductor associated with said second circuit, means for substituting said second potential for the first potential applied to the input conductor associated with said second circuit while said second potential is applied to the input conductor associated with said first circuit, and circuit means whereby both said first and second transistors are controlled to be in a state of conduction when said second potential is applied to both input conductors.

14. In a signaling circuit, a first transistor and a second transistor, each of said transistors having first, second, and third electrodes, a first conductor, a first impedance element connected between said first conductor and the first electrode of said first transistor, a second conductor, a second impedance element connected between said second conductor and the first electrode of said second transistor, a third conductor interconnecting the second electrodes of said first and second transistors, a third impedance element connected between said first conductor and the second electrode of said first transistor, a fourth impedance element connected between said second conductor and the second electrode of said second transistor, means for applying a first potential to both said first and second conductors, biasing means for maintaining both said first and said second transistors non-conductive when said first potential is applied to both said first and second conductors, means for substituting a second potential for the first potential applied to said first conductor while said first potential is applied to said second conductor thereby to alter the potential of both the first and second electrodes of said first transistor and to alter the potential of the second electrode of said second transistor, said first transistor remaining non-conductive in response to the altering of the potential of both its first and second electrodes and said second transistor becoming conductive in response to the altering of the potential of its second electrode.

15. The circuit of claim 14 in which the first, second, and third electrodes of each of said transistors are emitter, base, and collector electrodes respectively.

16. The circuit of claim 14 in which the first, second, third, and fourth impedance elements are resistors.

17. In a signaling circuit, a first transistor and a second transistor, each of said transistors having first, second, and third electrodes, a first conductor, a first impedance element connected between said first conductor and the first electrode of said first transistor, a second conductor, a second impedance element connected between said second conductor and the first electrode of said second transistor, a third conductor interconnecting the second electrodes of said first and second transistors, a third impedance element connected between said first conductor and the second electrode of said first transistor, a fourth impedance element connected between said second conductor and the second electrode of said second transistor, means for applying a first potential to both said first and second conductors, biasing means for maintaining both said first and said second transistors non-conductive when said first potential is applied to both said first and second conductors, means for substituting a second potential for the first potential applied to said first conductor while said first potential is applied to said second conductor thereby to alter the potential of both the first and second electrodes of said first transistor and to alter the potential of the second electrode of said second transistor, said first transistor remaining non-conductive in response to the altering of the potential of both its first and second electrodes and said second transistor becoming conductive in response to the altering of the potential of its second electrode, and means for substituting said second potential for the first potential connected to said second conductor while said second potential is applied to said first conductor thereby to alter the potential of both the first and second electrodes of said second transistor and to alter the potential of the second electrode of said first transistor, said second transistor remaining conductive in response to the altering of the potential of both its first and second electrodes and said first transistor becoming conductive in response to the altering of the potential of its second electrode.

18. The circuit of claim 17 in which the first, second, and third electrodes of each of said transistors are emitter, base, and collector electrodes respectively.

19. The circuit of claim 17 in which the first, second, third, and fourth impedance elements are resistors.

No references cited.

UNITED STATES PATENT OFFICE

CERTIFICATE OF CORRECTION

Patent No. 2,829,205

April 1, 1958

George Elliott

It is hereby certified that error appears in the printed specification of the above numbered patent requiring correction and that the said Letters Patent should read as corrected below.

Column 2, line 6, for "tht" read -- that --; line 68, for "equipment is" read -- equipment in --; column 3, line 37, for "rspectively" read -- respectively --; column 8, line 1, for "circuit or" read -- circuit for --.

Signed and sealed this 19th day of August 1958.

(SEAL)
Attest:

KARL H. AXLINE
Attesting Officer

ROBERT C. WATSON
Commissioner of Patents